(12) United States Patent
Saravanan et al.

(10) Patent No.: US 9,454,596 B2
(45) Date of Patent: Sep. 27, 2016

(54) ENTERPRISE ENTITY FOR USE IN A CALL CENTER

(75) Inventors: Senthilvel Saravanan, Milpitas, CA (US); Peter Koenig, Downers Grove, IL (US); David A. Funck, Wheaton, IL (US)

(73) Assignee: Aspect Software Inc., Chelmsford, MA (US)

( * ) Notice: Subject to any disclaimer, the term of this patent is extended or adjusted under 35 U.S.C. 154(b) by 412 days.

(21) Appl. No.: 12/325,794

(22) Filed: Dec. 1, 2008

(65) Prior Publication Data
US 2009/0210394 A1    Aug. 20, 2009

Related U.S. Application Data

(60) Provisional application No. 60/996,709, filed on Feb. 20, 2008.

(51) Int. Cl.
G06F 17/30    (2006.01)

(52) U.S. Cl.
CPC .................. G06F 17/30604 (2013.01)

(58) Field of Classification Search
USPC ...... 707/999.1, 999.101, 790, 802, 809, 810
See application file for complete search history.

(56) References Cited

U.S. PATENT DOCUMENTS

| | | | |
|---|---|---|---|
| 6,100,891 A | 8/2000 | Thorne | 345/357 |
| 6,298,356 B1 | 10/2001 | Jawahar et al. | 707/201 |
| 6,658,106 B1 | 12/2003 | Atkinson et al. | 379/265.11 |
| 6,873,694 B2 | 3/2005 | Lipinski | 379/201.02 |
| 6,889,195 B2 | 5/2005 | Strandberg | 705/1 |
| 7,046,789 B1 | 5/2006 | Anderson et al. | 379/265.01 |
| 7,120,668 B2 | 10/2006 | Manber et al. | 709/205 |
| 7,228,281 B1 | 6/2007 | Ney et al. | 705/1 |
| 2006/0123022 A1* | 6/2006 | Bird | 707/100 |
| 2007/0208765 A1* | 9/2007 | Li et al. | 707/101 |
| 2008/0270490 A1* | 10/2008 | Watterott et al. | 707/204 |

FOREIGN PATENT DOCUMENTS

EP    WO 2005/120011    * 12/2005    ............. H04L 29/08

OTHER PUBLICATIONS

Sumathala Adabala, From virtualized resources to virtual computing grids: the In-VIGO system, Feb. 8, 2004, Science Direct.*

* cited by examiner

*Primary Examiner* — Amresh Singh
(74) *Attorney, Agent, or Firm* — Husch Blackwell LLP

(57) ABSTRACT

A call center application program allows a call center administrator to access, view, and edit data across multiple applications used by multiple customer interaction systems of the call center. The application program is adapted to retrieve data from a plurality of different applications and systems, consolidate redundant data, and display the data to a user, enabling a single unified view of resources across call center applications. Changes can be made to the data application program, which in turn propagates the changes to the individual call center applications, eliminating the need for the user to manually change the data in each individual application.

23 Claims, 3 Drawing Sheets

ENTERPRISE ENTITY FOR USE IN A CALL CENTER

This application claims the benefit of priority from and incorporates by reference into this application as if fully set forth herein the disclosures of Provisional Application Ser. No. 60/996,709, filed Nov. 30, 2007.

FIELD OF THE INVENTION

The present invention relates to contact centers and, more particularly, to a system and method for a unifying application and object used with contact center software.

BACKGROUND OF THE INVENTION

Many companies utilize contact centers, often referred to as call centers, to handle communications and transactions between customers and potential customers. These interactions may occur, for example, by way of telephone networks, internet connections, or voice-over IP connections.

These companies generally maintain databases that contain information essential to facilitating their business. These databases can be specific to a sector of the business. For example, companies will typically maintain a database with information on customers and potential customers, such as their names, telephone numbers, addresses, and order history. Other databases may contain employee information, such as their names, email addresses, extensions, and which company-defined group they work in.

In order to provide efficient customer support, an enterprise may implement a number of different systems that each use its own database. A typical contact center generally uses several customer interaction systems in its network. Examples of customer interaction systems include Automatic Call Distributors (ACDs), predictive dialing systems, web servers, email servers, work flow servers, or network routers. Further, each customer interaction system may employ its own software application native to that system, requiring a user to run a separate application to interact with each system, and consequently with each database.

Thus, call center administrators and managers entering an enterprise-wide resource may be required to individually administer the same resource in one or more contact center applications manually and repetitively. This requires a user to be trained in the use and administration of many different contact center application tools. The user must also be careful to avoid potential manual user errors, such as wrong or missed configurations, which may lead to lost time, troubleshooting and additional expenses. As a result, often an administrator must use one set of applications to monitor resource performance and utilization, and another set of applications to optimize, manage and/or make adjustments to these resources.

One example of a typical enterprise-wide system resource is a contact center agent, which is typically a human resource. This agent can be defined on the ACD as a resource for handling customer voice contacts, and also on the Workforce Management Applications (WFMs) as an object for scheduling and schedule forecasting purposes. Using the application-specific tools for each respective application, an administrator may define this agent on the ACD as Robert Lewis, and on the Workforce Management application as Bob Lewis.

Presently, a user such as a contact center administrator who wishes to keep track of Robert Lewis must utilize separate applications and systems to configure, manage and monitor Robert Lewis. Further, the administrator must also be aware that both Robert Lewis and Bob Lewis are one and the same resource when analyzing reports and when making changes to his attributes on the source applications. This problem becomes exponentially difficult and causes many administration and monitoring problems when thousands of resources are managed across numerous contact center applications.

Therefore, there is a need in the art to have a single application manage various parameters within many customer interaction systems across an enterprise to maximize efficiency and minimize discrepancies in data.

SUMMARY OF THE INVENTION

According to an embodiment, a method of using a computer is provided to manage data within an enterprise, said enterprise including a plurality of different applications, said method comprising using a first application to retrieve data from a second application, the retrieved data relating to a specific data type of the first application as defined by user-modifiable rules of the first application, using a first application to retrieve data from at least one other application, the retrieved data relating to a specific data type of the first application as defined by user-modifiable rules of the first application, and consolidating any redundant data into a single data item, wherein said redundant data is data relating to the same specific data type of the first application is described.

According to another embodiment, a method of using a computer to manage data within an enterprise is provided, said enterprise including a plurality of different applications, said method comprising receiving user-inputted data, identifying at least one target application that will receive the inputted data, wherein the target application comprises a target data field relating to a specific data type of the first application according to the user-modifiable rules of the first application, wherein said specific data type was modified by the user-inputted data, formatting the user-inputted data to the format of the target data field, and changing the data in the target data field to reflect the user-inputted data is described.

According to another aspect of the present invention, a system for managing data within an enterprise, the system including, a first application, a second application, wherein the second application has at least one data field relating to a data field in the first application as defined by user-modifiable rules of the first application; at least one other application, wherein the at least one other application has at least one data field relating to a data field in the first application as defined by user-modifiable rules of the first application, wherein the first application is adapted to retrieve data from the at least one data field in the second application, and wherein the first application is also adapted to retrieve data from the at least one data field in the at least one other application, wherein the first application is adapted to consolidate all data relating to the same data field in the first application.

According to another aspect of the present invention, a system of using a computer to manage data within an enterprise, said enterprise including a plurality of different applications, said system comprising: a first application adapted to receive user-inputted data, at least one target application to receive the user-inputted data wherein the at least one target application comprises a target data field relating to a specific data type of the first application according to the user-modifiable rules of the first application, and wherein said specific data type is modified by the user-inputted data, and wherein the first application is adapted to format the user-inputted data to the format of the target data field, and wherein the first application is adapted to change the data in the target data field to reflect the user-inputted data.

BRIEF DESCRIPTION OF THE DRAWINGS

The following detailed description sets forth numerous specific details in order to provide an understanding of the invention. However, those of ordinary skill in the art will appreciate that the invention may be practiced without these specific details. In other instances, well known methods, procedures, components, algorithms, and protocols have not been described in detail so as not to obscure the invention.

DETAILED DESCRIPTION

Figure 1:
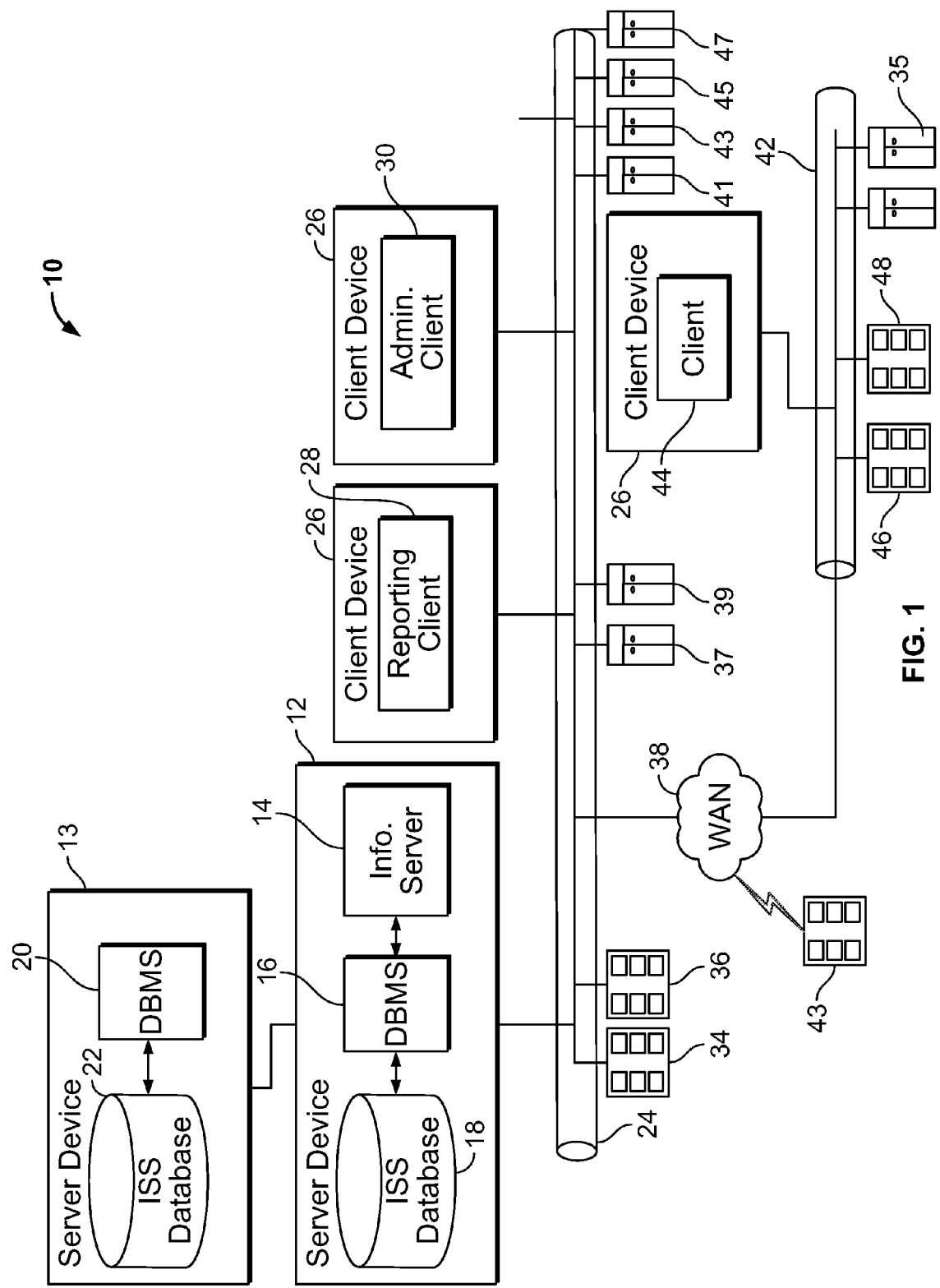
FIG. 1 is a block diagram which illustrates an embodiment of an exemplary call center environment within which the present invention may be employed in accordance with the teachings of one aspect of the present invention.

While the present invention is susceptible of embodiments in various forms, there is shown in the drawings and will hereinafter be described some exemplary embodiments, with the understanding that the present disclosure is to be considered an exemplification for the invention and is not intended to limit the invention to the specific embodiments illustrated. In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects.

For the purposes of the present invention the term "interaction record" shall be taken to include any record that includes information pertaining to a customer interaction. The term "interaction record" shall not be limited to the specific structure or content described below. The term "customer interaction" shall be taken to include, but not be limited to, a telephone call, an e-mail request or response, a fax request or response, an instant messaging receipt or response, a web-based request or response, or any other communication between a customer and a service or product provider.

FIG. 1 illustrates an embodiment of an exemplary customer interaction environment 10 which includes a server device 12 that hosts an information server 14 and database management system (DBMS) 16 as shown. The illustrated information server 14 may collect, process, consolidate and provide access to near-real-time and historical transaction data generated by, and pertaining to, multiple customer interaction systems (e.g., ACDs, e-mail servers, web servers, Computer Telephony Integration (CTI) servers, and Interactive Voice Response (IVR) workflow servers, other workflow servers or network routers) and other devices, within the environment 10. The information server 14 accordingly may function as a framework for capturing, summarizing and storing interaction data form multiple sources, as will be described below.

The DBMS 16 may comprise a collection of programs that maintain and facilitate access to an Information Server Software (ISS) database 18. The database 18 may constitute information (e.g., both data and metadata) regarding resource configurations, transactions and other environment parameters, conditions and functions (e.g., call, agent and truck events, fact records and summaries). A mirror server device 13, in one exemplary configuration, hosts a replicated DBMS 20 that may be implemented, for example, by using the Oracle Advanced Replication Server, and that maintains and facilitates access to a replicated ISS database 22. The replicated DBMS 20 may be utilized as a standby or redundant system, or to generate historical reports. In an alternative configuration, the information server 14 may reside on the server device 12, and the DBMS 16 may reside on the server device 13 to facilitate off-board performance gains as the resources of the server device 12 are devoted exclusively to the information server 14.

In the illustrated embodiment of FIG. 1, the server device 12 may be coupled by a Local Area Network (LAN) 24 to network devices 26 as shown, each of which may host a software client 28, 30, 44. In an alternative embodiment, the LAN 24 may be replaced by any network type, such as for example, a Wide Area Network (WAN) or the Internet. The software clients may, for example, include a reporting client 28 and an administrative client 30 as shown. The reporting client 28 may be any Open Database connectivity (ODBC) compliant application, and may make queries against the database 18, and format the results of these queries based on a predefined set of instructions (e.g., a report definition). The reporting client 28 may further include a method of scheduling reports to run at predetermined times. The administrative client 30 may be a Microsoft Foundation Class (MFC) 4.0 application, and could accordingly reside on a Windows 95, Windows NT workstation or Windows NT Server platform. The administrative client 30 may facilitate configuration and management of the information server 14 on the server device 12. For example, utilizing a graphical user interface (GUI) provided by the administrative client 30, a system administrator may define data sources, set data destinations, specify rules, formulas and frequencies for data summaries, view server system metadata information, events, and task statuses. The administrative client 30, for example, may communicate with server components of the information server 14 through an Application Program Interface (API) that makes use of Remote Procedure Call (RPC) to facilitate remote management of the information server 14 over the LAN 24 or over a Wide Area Network (WAN) 38.

Also coupled to the LAN 24 (or WAN in an alternative embodiment) are a pair of customer interaction systems in the exemplary forms of Automatic Call Distributors (ACDs) 34 and 36, a workflow server 37, a network router 39, a CTI server 41, an IVR server 43, an e-mail server 45, and a web server 47. Each of the ACDs 34 and 36 may be, for example, the Aspect.RTM™ ACD System manufactured by Aspect Telecommunications Corp. of San Jose, Calif. Each of the ACDs 34 and 36 may typically be coupled to a Public Switched Telephone Network (PSTN) (not shown) via which the respective ACDs may receive transaction requests (e.g., phone calls from telephone units, such as those used in homes or businesses). Each of the ACDs 34 and 36 may also be coupled to the Internet, an Intranet, or any other network over which a transaction may be initiated. Also coupled to each of the ACDs 34 and 36 are a number of network devices (not shown) in the form of agent computers or telephone units via which human and/or software agents interact with a respective ACD and with customers.

In one embodiment, the WAN 38 may couple the LAN 24 to a remote LAN 42 as shown, and to a further ACD 43. A network device 35, and a further pair of ACDs 46 and 48 (or other customer interaction systems), may be coupled to the remote LAN 42 as shown.

It will be appreciated that, in order to maximize efficiency and maintain the integrity of data across all customer interaction systems within the customer interaction environment 10, it would be advantageous to provide the system administrator with an enterprise-wide view of information and changes thereto in all customer interaction systems within the environment 10.

Figure 2:
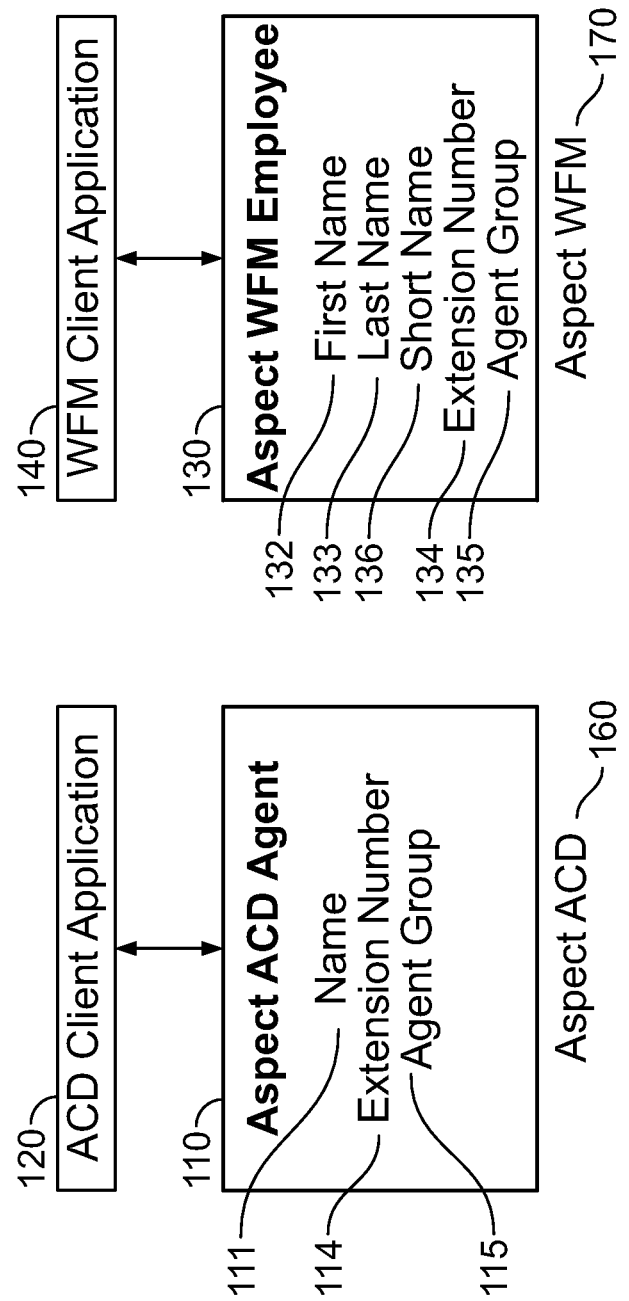
FIG. 2 is a block diagram which illustrates an example of an agent resource configured in two separate call center applications without the use of an enterprise entity application.

Referring now to FIG. 2, an illustration of a typical call center system agent resource configured and implemented in two different contact center applications without the use of an enterprise entity application is shown. The two exemplary software applications, preferably implemented as software on one or more computers in a call center, are an ACD 160 and a Workforce Management Application (WFM) 170.

ACD 160 may comprise an object that represents a call center agent, ACD agent object 110. ACD agent object 110 may include a plurality of data fields that contain information relevant to a particular call center agent. A user must run ACD client application 120 in order to access data contained within agent object 110. In one embodiment, ACD agent object 110 comprises data fields for name 111, extension number 114, and agent group 115.

WFM 170 may comprise an object that represents the same call center agent, employee object 130. WFM employee object 130 may also comprise a plurality of data fields that contain information relevant to the call center agent. This information may or may not be redundant with the information contained within agent object agent 110. A user must run WFM client application 140 to access data contained within employee object 130. In one embodiment, WFM includes data fields for first name 132, last name 133, short name 136, extension number 134, and agent group 135.

As shown by FIG. 2, a user, such as a call center administrator, who wishes to retrieve or edit a data field regarding a resource such as a call center agent cannot do so unless they use the specific application that accesses that data field. If the desired data includes multiple data fields that are accessed by different applications respectively, then the user must use each of those applications to access each instance of the desired data. For example, if a user is using ACD client application 120, the user cannot access data fields contained in the WFM employee object 130 unless the user switches applications and begins using the WFM client application 140. Similarly, a user using WFM client application 140 cannot access data fields contained in the ACD agent object 110 unless the user switches applications and begins using the ACD client application 120. Consequently, much time is wasted switching back and forth between applications, especially as the number of applications and objects in an enterprise grows. Further, the possibility for error is greatly increased when redundant data must be separately entered using more than one application.

Figure 3:
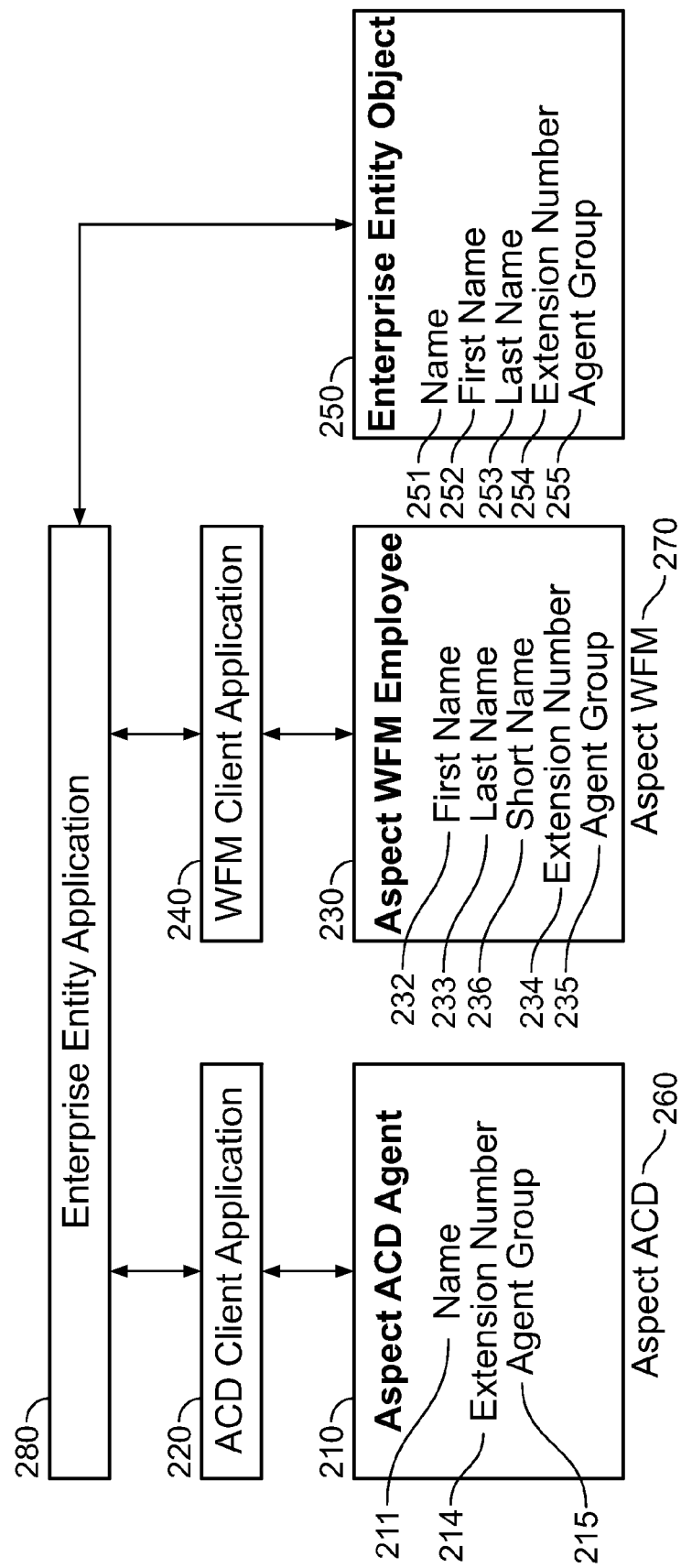
FIG. 3 is a block diagram which illustrates an example of a call center agent resource configured and managed in two different applications with the use of the enterprise entity application.

Referring now to FIG. 3, a system diagram of an embodiment of a call center agent resource configured and managed in two different applications with the use of an enterprise entity application is shown. In the illustrated embodiment, the call center agent resource is implemented as an object in two different applications. ACD 260 maintains information about the call center agent resource in ACD agent object 210 and WFM 270 maintains information about the call center agent resource in WFM object 230. In the exemplary embodiment, ACD agent object 210 includes data fields for the agent's name 211, extension number 214, and agent group 215. Also in the exemplary embodiment, WFM employee object 230 includes data fields for the agent's first name 232, last name 233, short name 236, extension number 234, and agent group 235. Those of ordinary skill in the art will appreciate that the applications, application objects, and data fields may vary from system to system.

According to the embodiment shown in FIG. 3, a user who wishes to view information about a call center agent resource can use Enterprise Entity Application 280 to view the desired information regardless of the system that initially contains the resource. In the exemplary embodiment, Enterprise Entity Application 280 is adapted to read data from objects that were previously only accessible from the individual call center systems. According to an embodiment, Enterprise Entity Application 280 is capable of reading data fields from both the ACD object 210 and the WFM employee object 230 via the ACD Client Application 220 and the WFM Client Application 240 as shown in FIG. 3, and stores the data in Enterprise Entity Object 250. Therefore, by using Enterprise Entity Application 280 to access the Enterprise Entity Object 250, a user can view data from agent object 210 and/or employee object 230 without having to determine which application must be run to properly read the desired information. In the illustrated embodiment of FIG. 3, the Enterprise Entity Object 250 may contain a Name 251, First Name 252, Last Name 253, Extension Number 254 and Agent Group 255. In an embodiment, the data accessed by the user is enterprise-wide, and therefore does not require that the user run multiple applications in order to access data in multiple data fields within the multiple applications. Further, when the user changes the data in the Enterprise Entity Object 250, the Enterprise Entity Application 280 can automatically update the data within the appropriate system's object. For example, if the user changes the First Name 252 data field in Enterprise Entity Object 250, the change will be reflected in WFM employee object 230. This allows the call center administrator to consolidate individual representations of the same resource across one or more contact center applications into a single application.

Enterprise Entity Application 280 may be adapted to recognize data in multiple objects across applications that are related to the same data field in Enterprise Entity Object 250. This data can be consolidated into a single field in Enterprise Entity Object 250 to prevent unnecessary multiple data fields containing the same data.

The relationship between a data field in Enterprise Entity Object 250 to a corresponding data field in a specific system or application can be either preprogrammed into the Enterprise Entity Application 280, or user-defined. For example, Enterprise Entity Application 280 may be pre-programmed to include a list of supported applications, and data fields within those applications that relate to corresponding data fields in Enterprise Entity Object 250. This programmable list may be updated as desired, in an embodiment. In the embodiment shown in FIG. 3, extension number 214 in ACD agent 210 and extension number 234 in WFM employee 230 are both related to extension number 254 in the Enterprise Entity Object 250. Also in the present embodiment, agent group 215 and agent group 235 are both related to agent group 255.

According to either pre-programmed and/or user-defined rules, Enterprise Entity Application 280 may recognize data fields in different applications that are related to a single data field in Enterprise Entity Object 250. Therefore, in the illustrated embodiment, only a single data field, extension number 254, contains the redundant data in the related data fields in ACD agent object 210 and WFM employee object 230. Likewise, a single data field, agent group 255, may contain the data in the related data fields in ACD agent object 210 and WFM employee object 230.

According to an embodiment, Enterprise Entity Application 280 can also be configured to respond accordingly to discrepancies in redundant data fields to ensure strict data integrity. For example, if agent group 215 in ACD agent object 210 does match agent group 235 in WFM employee object 230, and the two data fields are related, Enterprise Entity Application 280 could be configured to alert the user before taking any action, attempt to correct the error based on pre-programmed or user-defined rules, take some other appropriate pre-programmed and/or user-defined action, and/or use an appropriate combination of the above. Suggestions to the user may be provided on whether to make specific changes and/or whether to take a course of action with regard to data manipulation in the enterprise system.

Corrective action taken by Enterprise Entity Application 280 may be situation-dependent. For example, when there is a discrepancy between two data fields in individual applications that are mapped to the same data field in Enterprise Entity Object 250, Enterprise Entity Application 280 may suggest changing one of the data fields to match the other. Enterprise Entity Application 280 may use a preprogrammed, updatable set of rules to determine which data field to change, according to an embodiment.

In an embodiment of the invention, corrective action taken by Enterprise Entity Application 280 ensures that the data contained within each individual application is consistent with related data in the Enterprise Entity Application 280. As a result, a user who views Name 251 in Enterprise Entity Object 250 should see the same or similar data when viewing Name 211 in Aspect ACD Agent 210, and/or when viewing both First Name 232 and Last Name 233 in Aspect WFM Employee 230.

In an embodiment, Enterprise Entity Application 280 retrieves data from the individual applications by using translators capable of converting the data from the individual objects, such as WFM employee object 230, into a format used by Enterprise Entity Object 250.

Those skilled in the art will appreciate that Enterprise Entity Application 280 may access data fields in other applications, objects, and resources, and is not necessarily limited to the two applications as shown in the embodiment. For example, in some embodiments, Enterprise Entity Application 280 can read and write data from DNIS (Dialed Number Identification Service) applications, ANI (Automatic Number Identification) applications, Agent Groups and Trunk Groups. Consequently, Enterprise Entity Application 280 can be configured to read and write any type of data into fields in Enterprise Entity Object 250, as well as perform specific functions regarding that data in any number of applications, objects and resources, including, but not limited to, the foregoing examples. Data in Enterprise Entity Object 250 can be imported from external systems, and Enterprise Entity Object 250 can be adapted to import data from proprietary databases as well.

In an embodiment, Enterprise Entity Application 280 allows the user to propagate changes to data of other application objects, such as ACD agent object 210 and/or WFM employee object 230, by making changes to the Enterprise Entity Object 250. These changes are propagated to the applications that contain data fields related to the data field changed by the user. These changes can be either automatically propagated, or propagated to all or some of the target applications at the request of the user. This propagation of data eliminates the need for the user to make repeated changes to data in multiple applications, and also ensures the integrity of data across the enterprise.

In an embodiment, Enterprise Entity Application 280 provides supervisors, such as call center administrators, the ability to have a greater degree of control of the enterprise without loss of efficiency by allowing them to monitor and view changes in enterprise data quickly. According to one embodiment, Enterprise Entity Application 280, upon detecting a change in data in one of the call center applications, prompts a supervisor to approve the data change or changes. If the change is not approved, then the change in the data field of the application is restored to its value prior to the change. Alternatively, the supervisor may approve the changes for some, but not all, of the potential target systems. If the change is approved, Enterprise Entity Application 280 automatically updates the data in all applications containing a data field related to the data that was changed, including any related data that may be contained in Enterprise Entity Object 250. Therefore, changes to objects within the individual applications can be reviewed by a supervisor.

According to an embodiment, Enterprise Entity Application reacts to additions and subtractions of systems in the enterprise. When a system is removed from the enterprise, Enterprise Entity Application 280 can be adapted to automatically disassociate itself from that system, and stop sending and attempting to receive data from any application associated with the removed system. Similarly, when a system is added to the enterprise, the Enterprise Entity Application 280 can automatically identify which, if any, data fields in the target system are related to data fields in Enterprise Entity Object 250. Enterprise Entity Application 280 may automatically provide a list of matching resources in the newly-added system that may be added to the existing enterprise entity, and the user may or may not be prompted to add those resources.

From the foregoing it will be observed that numerous modifications and variations can be effectuated without departing form the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A method of controlling a plurality of different independent customer interaction system resources comprising enterprise agents and employees, and applications, for providing customer interaction services within an enterprise, said method comprising:

retrieving by a computer first retrieved data of a first object from a second application using a first application different than the second application, the first object implementing a resource of the plurality of system resources the first retrieved data relating to the resource and to a specific data type of the first application as defined by user-modifiable rules of the first application;

retrieving second retrieved data of a second object from a third application different from the first and second applications using the first application, the second object implementing the resource and not accessible by the second application, the second retrieved data relating to the resource and to the specific data type of the first application as defined by user-modifiable rules of the first application; and creating a common data item representative of both the first retrieved data and the second retrieved data, wherein the common data item relates to the resource and is the specific data type of the first application and can be retrieved by the first application without using the second and third applications, the first application configured to recognize data fields in the second and third applications that are related to a single data field of the first application and to consolidate the recognized data fields into a single common field to prevent unnecessary multiple data fields, the first application configured to recognize that the specific data type of the first application is related to the first retrieved data of the second application, and the first application automatically disassociating itself from any system that is removed from the enterprise by automatically stopping sending data and stopping attempting to retrieve data from any application associated with the system removed in response to removal of the system removed.

2. The method of claim 1 further comprising the step of displaying the common data item on a display and wherein the first application automatically updates respective related data of the second and third applications in response to a user change to the common data item.

3. The method of claim 1 further comprising the step of replacing the first retrieved data with the common data item.

4. The method of claim 3 further comprising the step of replacing the second retrieved data with the common data item.

5. The method of claim 1 wherein the first application is programmed to modify the common data item when there are discrepancies between the first retrieved data and the second retrieved data and to correct the discrepancies using user defined action.

6. The method of claim 1 wherein the first retrieved data uses a translator to convert the first retrieved data and second retrieved data to the specific data type of the first application.

7. A method controlling a plurality of different system resources and applications within a call-center enterprise, said method comprising:

identifying by a computer at least one target application to receive a common data item relating to a resource of the plurality of system resources created by and stored in a separate first application to represent related data retrieved from at least two respective different objects implementing the resource from at least two respective independent applications different from the first application, wherein the at least one target application comprises a target data field relating to the resource and to a specific data type of the first application, wherein said specific data type stores the common data item;

changing the data in the target data field to represent the common data item and wherein the first application is configured to recognize data in the at least two respective independent applications that are related to a single data field of the first application and to consolidate the recognized data into a single common data field to prevent unnecessary multiple data fields, the first application configured to recognize that the specific data type of the first application is related to the first retrieved data of the second application, and the first application automatically disassociating itself from any system that is removed from the enterprise by automatically stopping sending data and stopping attempting to retrieve data from any application associated with the system removed in response to removal of the system removed.

8. The method of claim 7 wherein the first application is programmed to identify the at least one target application.

9. The method of claim 8 wherein the rules to identify the at least one target application are user-defined.

10. The method of claim 7 wherein the at least one target application is identified based on a discrepancy between the common data item and the data stored in the target data field.

11. The method of claim 7 wherein the first application identifies the at least one target application based on the addition of the at least one target application to the call-center enterprise.

12. A system for controlling a plurality of different system resources and applications within an enterprise, said system comprising:

a computer having a first programmable module configured for retrieving data from a plurality of applications;

a second programmable module, different from the first programmable module, configured for holding data;

a third programmable module, different from the first and second programmable modules, configured for holding data;

wherein the first programmable module is configured for retrieving a first retrieved data of a first object from the second programmable module, the first object implementing a resource of the plurality of system resource, the first retrieved data relating to the resource and to a specific data type of the first programmable module as defined by user-modifiable rules of the first programmable module;

the first programmable module also configured for retrieving a second retrieved data of a second object from the third programmable module, the second object implementing the resource and not accessible by the second application, the second retrieved data relating to the resource and to the specific data type of the first programmable module as defined by user-modifiable rules of the first programmable module; and the first programmable module also configured for creating a common data item representative of both the first retrieved data and the second retrieved data, wherein the common data item relates to the resource and is the specific data type of the first programmable module and for storing the common data item in a common enterprise data object of the first module the first module configured to allow a user to access the enterprise data object to view data from the second and third modules without accessing the second and third modules, the first programmable module configured to recognize data in the second programmable module and the third programmable module that are related to a common data field of the first programmable module and to consolidate the recognized data into a single data item to prevent unnecessary multiple data items, the first programmable module configured to recognize that the specific data type of the first programmable module is related to the first retrieved data of the second programmable module, and the first programmable module automatically disassociating itself from any system that is removed from the enterprise by automatically stopping sending data and stopping attempting to retrieve data from any module associated with the system removed in response to removal of the system removed.

13. The system of claim 12 further comprising a display for displaying the common data item and wherein the first module automatically updates the second and third module in response to a user change to the common data item.

14. The system of claim 12 further comprising the step of replacing the first retrieved data with the common data item.

15. The system of claim 12 further comprising the steps of detecting a change in data in one of the programmable modules, prompting a supervisor to approve the change in data, and automatically updating data in all the programmable modules containing data related to the changed data if approved.

16. The system of claim 12 wherein the first programmable module is programmed to recognize that the specific data type of the first programmable module is related to the first retrieved data of the second programmable module.

17. The system of claim 12 wherein the first programmable module is programmed to modify the common data item when there are discrepancies between the first retrieved data and the second retrieved data.

18. The system of claim 12 wherein the first retrieved data uses a translator to convert the first retrieved data to the specific data type.

19. A system controlling a plurality of different system resources and applications within a call-center enterprise, said system comprising:
   a computer having a first programmable module configured for retrieving a first retrieved data of a first object implementing a resource of the plurality of resources from a first application and a second retrieved data of a second object from a different second application, the second object implementing the resource and not accessible by the first application, and creating a common data item representative of both the first and second retrieved data;
   a second programmable module, different from the first programmable module, comprising a specific data field, the specific data field holding the common data item;
   at least one target programmable module, wherein the first programmable module is configured for identifying the at least one target programmable module to receive the common data item, the at least one target programmable module comprising a target data field relating to the resource and to the specific data field;
   the first programmable module also configured for changing the data in the at least one target data field to represent the common data item, the first programmable module configured to recognize data in the second programmable module and on the target programmable module that are related to a common data field of the first programmable module and to consolidate the recognized data into a single data field to prevent unnecessary multiple data fields, the first programmable module configured to recognize that the specific data type of the first programmable module is related to the first retrieved data of the second programmable module, and the first programmable module automatically disassociating itself from any system that is removed from the enterprise by automatically stopping sending data and stopping attempting to retrieve data from any application associated with the system removed in response to removal of the system removed.

20. The system of claim 19 wherein the first programmable module is programmed to identify the at least one target programmable module.

21. The system of claim 19 wherein the rules to identify the at least one target programmable module are user-defined.

22. The system of claim 19 wherein the at least one target programmable module is identified based on a discrepancy between the common data item and the data stored in the target data field.

23. The system of claim 19 wherein the first programmable module identifies the at least one target programmable module based on the addition of the at least one target programmable module to the call center enterprise.

* * * * *